United States Patent
Ma et al.

(10) Patent No.: US 12,279,293 B2
(45) Date of Patent: Apr. 15, 2025

(54) SCHEDULING OFFSET SELECTION FOR NTN

(71) Applicant: QUALCOMM Incorporated, San Diego, CA (US)

(72) Inventors: Liangping Ma, San Diego, CA (US); Xiao Feng Wang, San Diego, CA (US); Wanshi Chen, San Diego, CA (US); Changhwan Park, San Diego, CA (US); Bharat Shrestha, San Diego, CA (US); Ayan Sengupta, San Diego, CA (US); Alberto Rico Alvarino, San Diego, CA (US); Umesh Phuyal, San Diego, CA (US); Peter Gaal, San Diego, CA (US); Harikumar Krishnamurthy, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/654,222

(22) Filed: Mar. 9, 2022

(65) Prior Publication Data
US 2023/0104008 A1    Apr. 6, 2023

Related U.S. Application Data

(60) Provisional application No. 63/262,014, filed on Oct. 1, 2021.

(51) Int. Cl.
*H04W 72/11* (2023.01)
*H04W 72/21* (2023.01)
*H04W 72/23* (2023.01)
*H04W 72/543* (2023.01)
*H04W 84/06* (2009.01)

(52) U.S. Cl.
CPC ......... *H04W 72/543* (2023.01); *H04W 72/21* (2023.01); *H04W 72/23* (2023.01); *H04W 84/06* (2013.01)

(58) Field of Classification Search
CPC . H04W 76/28; H04W 72/0446; H04W 74/04; H04W 16/28; H04W 72/11; H04W 76/10; H04W 52/08; H04W 74/0836; H04W 72/231; H04W 52/32; H04W 74/0833; H04W 72/0453; H04W 72/232; H04W 76/27; H04W 72/20; H04W 74/08
See application file for complete search history.

(56) References Cited

U.S. PATENT DOCUMENTS

| | | | |
|---|---|---|---|
| 2023/0099762 A1* | 3/2023 | Khoshkholgh Dashtaki | ............... H04W 56/0045 370/350 |
| 2024/0204925 A1* | 6/2024 | Ye | .......................... H04L 1/1812 |

* cited by examiner

*Primary Examiner* — Tu X Nguyen
(74) *Attorney, Agent, or Firm* — Procopio, Cory, Hargreaves & Savitch LLP

(57) ABSTRACT

Aspects present herein relate to methods and devices for wireless communication including an apparatus, e.g., a UE and/or a base station. The apparatus may identify at least one scheduling offset associated with a propagation delay between a base station of a NTN and the UE. The apparatus may also select a first scheduling offset of the at least one scheduling offset associated with the propagation delay between the base station and the UE. Additionally, the apparatus may transmit, to the base station, an uplink transmission based on the first scheduling offset, the uplink transmission being associated with a PUSCH, a PUCCH, or a PRACH.

22 Claims, 12 Drawing Sheets

SCHEDULING OFFSET SELECTION FOR NTN

CROSS REFERENCE TO RELATED APPLICATION(S)

This application claims the benefit of and priority to U.S. Provisional Application Ser. No. 63/262,014, entitled "SCHEDULING OFFSET SELECTION FOR NTN" and filed on Oct. 1, 2021, which is expressly incorporated by reference herein in its entirety.

TECHNICAL FIELD

The present disclosure relates generally to communication systems, and more particularly, to scheduling offsets for a non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify at least one scheduling offset associated with a propagation delay between a network node of a non-terrestrial network (NTN) and the UE. The apparatus may also receive, from the network node, an indication of a first scheduling offset of the at least one scheduling offset associated with the propagation delay between the network node and the UE, where the first scheduling offset is selected based on the indication. Additionally, the apparatus may select a first scheduling offset of the at least one scheduling offset associated with the propagation delay between the network node and the UE. The apparatus may also adjust the first scheduling offset based on the propagation delay between the network node and the UE. The apparatus may also transmit, to the network node, an uplink transmission based on the first scheduling offset, the uplink transmission being associated with a physical uplink shared channel (PUSCH), a physical uplink control channel (PUCCH), or a physical random access channel (PRACH).

In another aspect of the disclosure, a method, a computer-readable medium, and an apparatus are provided. The apparatus may be a network node, e.g., a base station of a non-terrestrial network (NTN). The apparatus may configure at least one scheduling offset associated with a propagation delay between the network node and a user equipment (UE). The apparatus may also transmit, to the UE, an indication of a first scheduling offset of the at least one scheduling offset associated with the propagation delay between the network node and the UE. Further, the apparatus may receive, from the UE, an uplink transmission based on the first scheduling offset of the at least one scheduling offset, the uplink transmission being associated with a physical uplink shared channel (PUSCH), a physical uplink control channel (PUCCH), or a physical random access channel (PRACH).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
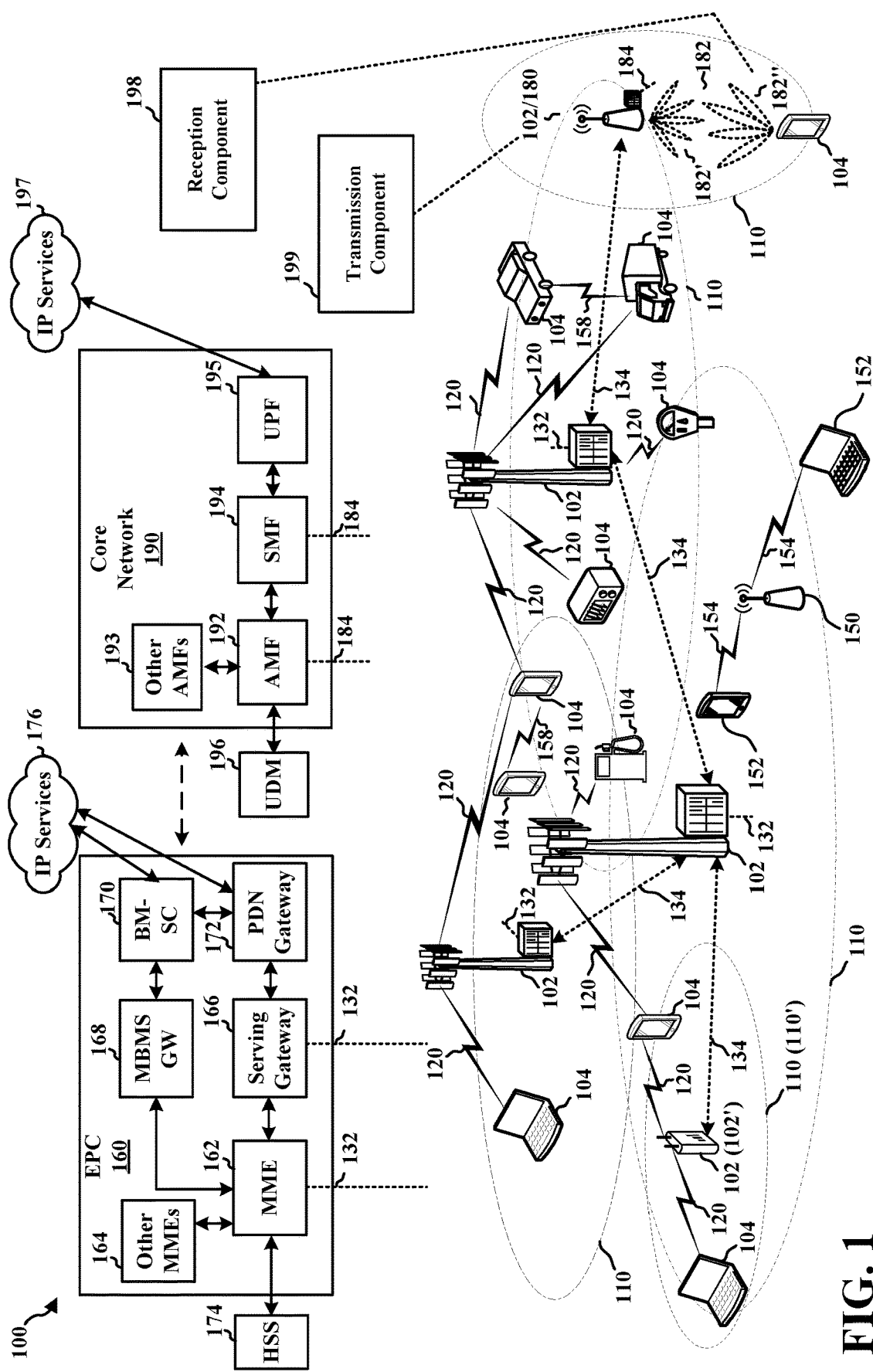
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc., of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. A network node can be implemented as a base station (i.e., an aggregated base station), as a disaggregated base station, an integrated access and backhaul (IAB) node, a relay node, a sidelink node, etc. A network entity can be implemented as a base station (i.e., an aggregated base station), or alternatively, as a central unit (CU), a distributed unit (DU), a radio unit (RU), a Near-Real Time (Near-RT) RAN Intelligent Controller (RIC), or a Non-Real Time (Non-RT) RIC in a disaggregated base station architecture.

Referring again to FIG. 1, in certain aspects, the UE 104 may include a reception component 198 configured to identify at least one scheduling offset associated with a propagation delay between a network node of a non-terrestrial network (NTN) and the UE. Reception component 198 may also be configured to receive, from the network node, an indication of a first scheduling offset of the at least one scheduling offset associated with the propagation delay between the network node and the UE, where the first scheduling offset is selected based on the indication. Reception component 198 may also be configured to select a first scheduling offset of the at least one scheduling offset associated with the propagation delay between the network node and the UE. Reception component 198 may also be configured to adjust the first scheduling offset based on the propagation delay between the network node and the UE. Reception component 198 may also be configured to transmit, to the network node, an uplink transmission based on the first scheduling offset, the uplink transmission being associated with a physical uplink shared channel (PUSCH), a physical uplink control channel (PUCCH), or a physical random access channel (PRACH).

Referring again to FIG. 1, in certain aspects, the base station 180 may include a transmission component 199 configured to configure at least one scheduling offset associated with a propagation delay between the network node and a user equipment (UE). Transmission component 199 may also be configured to transmit, to the UE, an indication of a first scheduling offset of the at least one scheduling offset associated with the propagation delay between the network node and the UE. Transmission component 199 may also be configured to receive, from the UE, an uplink transmission based on the first scheduling offset of the at least one scheduling offset, the uplink transmission being associated with a physical uplink shared channel (PUSCH), a physical uplink control channel (PUCCH), or a physical random access channel (PRACH).

Although the following description may be focused on 5G NR, the concepts described herein may be applicable to other similar areas, such as LTE, LTE-A, CDMA, GSM, and other wireless technologies.

Figure 2:
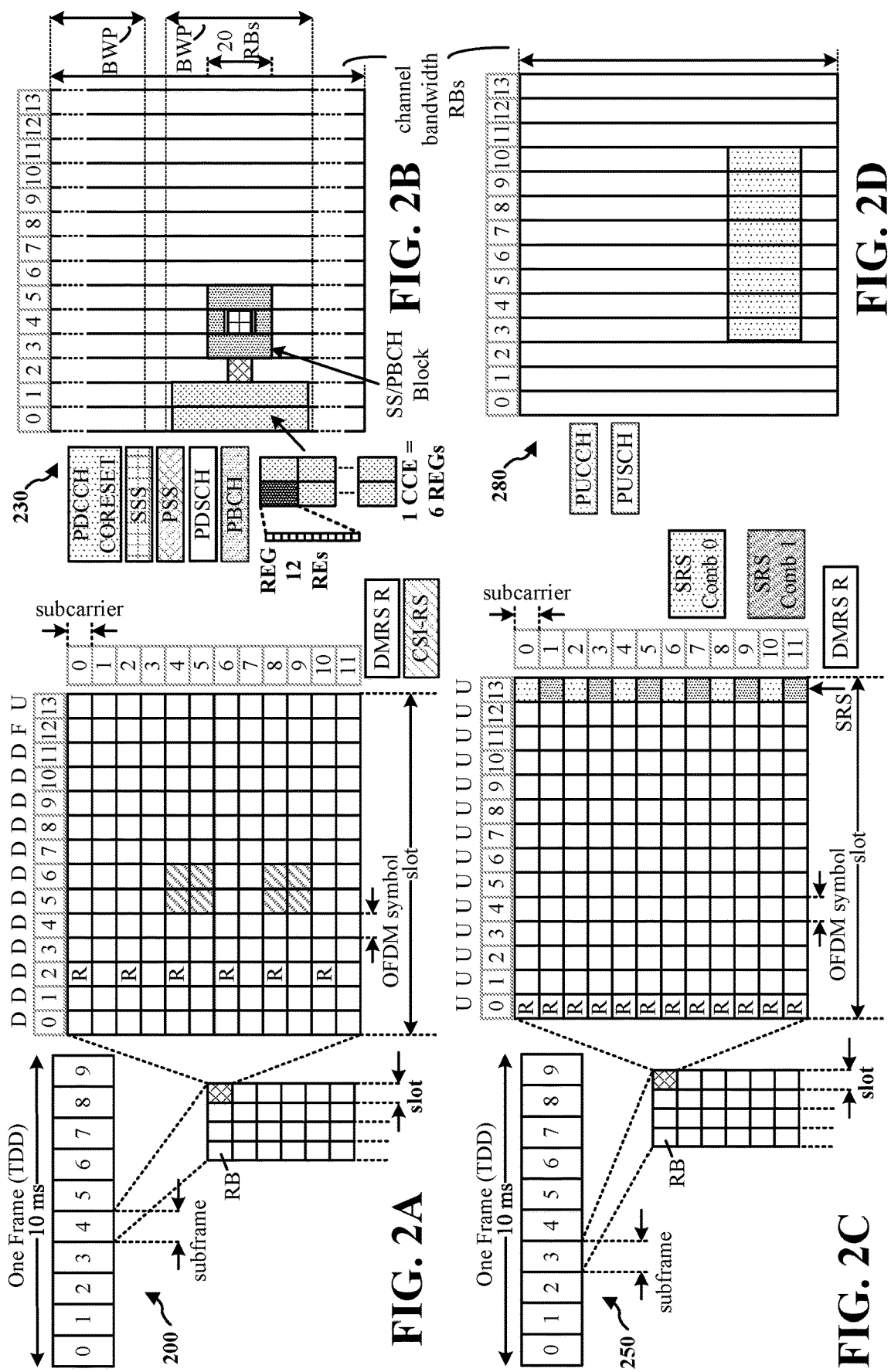
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
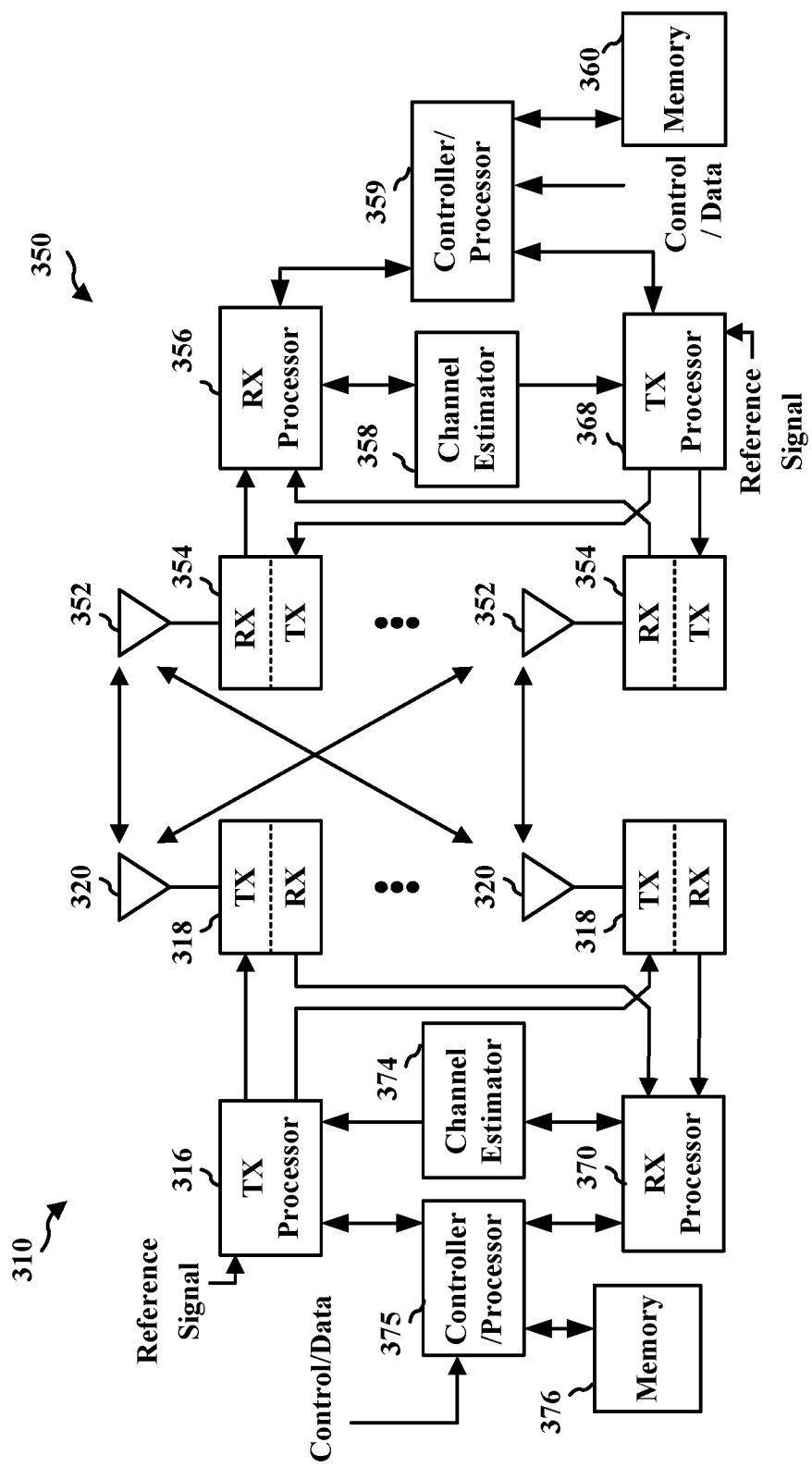
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Aspects of wireless communication may include a number of different types of networks, such as a terrestrial network or a non-terrestrial network (NTN). An NTN may include any network that involves non-terrestrial flying objects, e.g., satellite communication networks, high altitude platform systems (HAPS), and air-to-ground (ATG) networks. For instance, satellite communication networks may utilize different types of satellites including low Earth orbiting (LEO) satellites, medium Earth orbiting (MEO) satellites, and/or geosynchronous Earth orbiting (GEO) satellites. High altitude platform systems (HAPS) are airborne platforms which may include different airborne objects, e.g., airplanes, balloons, and airships. Further, air-to-ground (ATG) networks aim to provide in-flight connectivity for airplanes by utilizing ground stations which play a similar role as base stations in terrestrial mobile networks.

In some types of NTNs, a cell may be provided by a network node or a base station in an NTN. For instance, NTN may refer to a network for which access is provided by a non-terrestrial base station, such as a base station carried by an NTN entity, e.g., a satellite, an airplane, a balloon, an unmanned aerial vehicle, a high altitude platform station, etc. A base station of the NTN may be associated with regenerative deployment, i.e., a base station carried by an NTN entity, or associated with transparent deployment, i.e., a base station on the ground that communicates via the NTN entity.

Figure 4B:
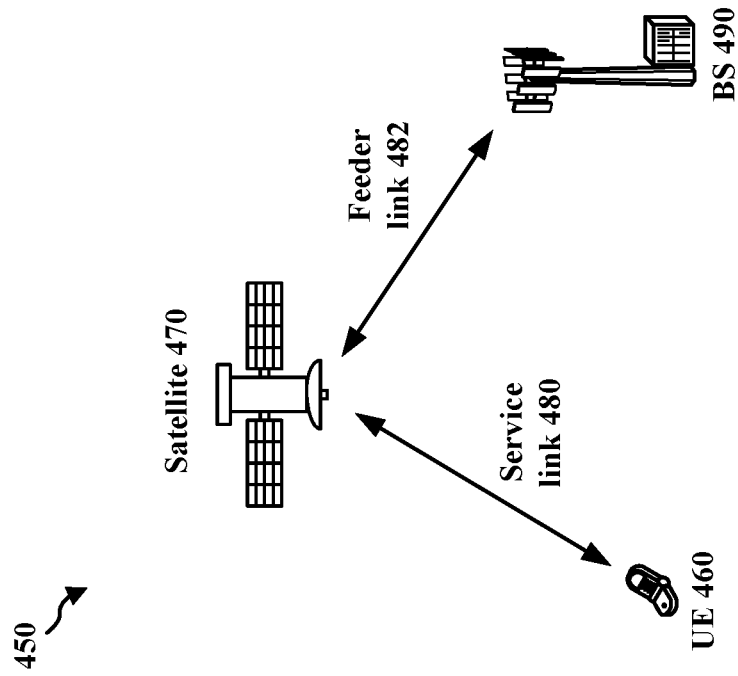
FIG. 4B is a diagram illustrating an example satellite deployment.
Figure 4A:
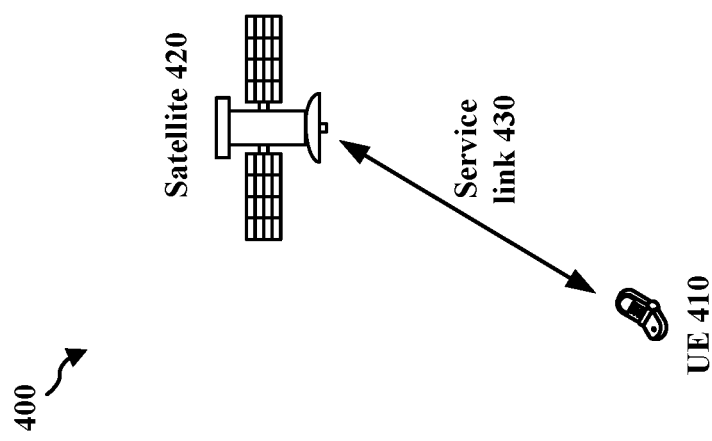
FIG. 4A is a diagram illustrating an example satellite deployment.

FIGS. 4A and 4B are diagrams 400 and 450 illustrating examples of regenerative satellite deployment and transparent satellite deployment, respectively. Specifically, FIG. 4A is a diagram 400 illustrating an example regenerative satellite deployment in an NTN. As shown in FIG. 4A, UE 410 is served by satellite 420 via service link 430. For instance, the satellite 420 may include a network node, a base station, a gNB, etc. In some instances, the satellite 420 may be referred to as a network node, a non-terrestrial base station, an NTN entity, a regenerative repeater, an on-board processing repeater, etc. Additionally, the satellite 420 may demodulate an uplink radio frequency signal and/or modulate a baseband signal derived from the uplink radio signal to produce a downlink radio frequency transmission. The satellite 420 may also transmit the downlink radio frequency signal on the service link 430. Moreover, the satellite 420 may provide a cell that covers an area surrounding the UE 410.

FIG. 4B is a diagram 450 illustrating an example of a transparent satellite deployment in an NTN. As shown in FIG. 4B, UE 460 is served by satellite 470 via the service link 480. The satellite 470 may be an NTN entity or a transparent satellite. The satellite 470 may also relay a signal received from base station 490 (i.e., a gateway) via a feeder link 482. For example, the satellite 470 may receive an uplink radio frequency transmission and may transmit a downlink radio frequency transmission without demodulating the uplink radio frequency transmission. In some instances, the satellite 470 may frequency convert the uplink radio frequency transmission received on the service link 480 to a frequency of the uplink radio frequency transmission on the feeder link 482 and may amplify and/or filter the uplink radio frequency transmission. Also, the UE 410 and 460 in FIGS. 4A and 4B may be associated with a global navigation satellite system (GNSS) capability and/or a global positioning system (GPS) capability. The satellite 470 may also provide a cell that covers an area surrounding the UE 460.

In some aspects, the service link 480 may include a link between the satellite 470 and the UE 460 and may include an uplink (i.e., a link from the UE 460 to the satellite 470) and/or a downlink (i.e., a link from the satellite 470 to the UE 460). The feeder link 482 may include a link between the satellite 470 and the base station 490. Further, feeder link 482 may include an uplink (i.e., a link from the UE 460 to the base station 490) or a downlink (i.e., a link from the base station 490 to the UE 460).

Additionally, the feeder link 482 and the service link 480 may each experience Doppler effects due to the movement of the satellites 420/470 and/or the movement of the UEs 410/460. The Doppler effects may be significantly larger in an NTN compared to a terrestrial network. Also, the Doppler effect on the feeder link 482 may be compensated for, but may still be associated with some amount of uncompensated frequency error. Moreover, the base station 490 may be associated with a residual frequency error and/or the satellite 420/470 may be associated with an on-board frequency error. These sources of frequency error may cause a received downlink frequency at the UE 410/460 to drift from a target downlink frequency.

Figure 5:
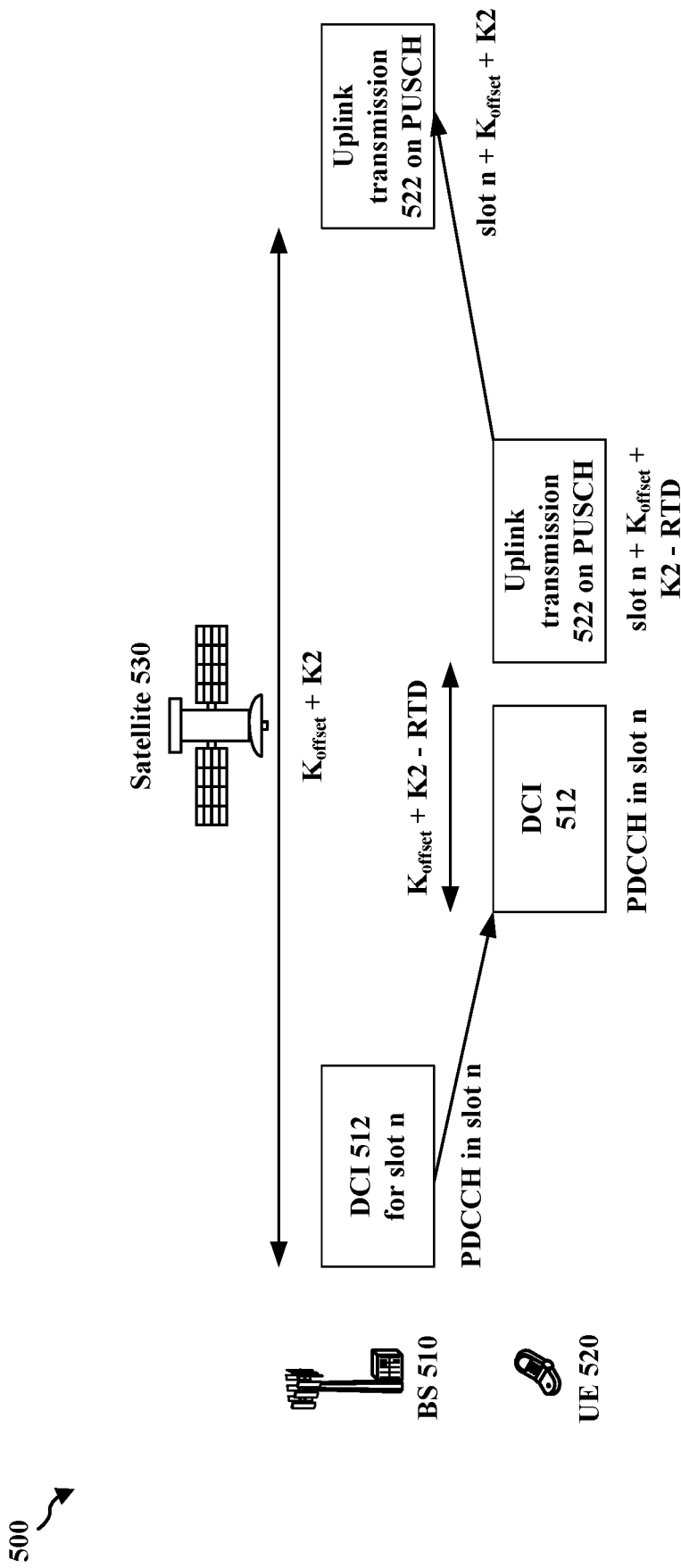
FIG. 5 is a diagram illustrating an example of a timing offset.

FIG. 5 is a diagram 500 illustrating an example of a scheduling offset. As shown in FIG. 5, diagram 500 is a scheduling offset (e.g., K_offset, Koffset, or $K_{offset}$) or a timing offset that may be used to account for a propagation delay in an NTN. Additionally, the scheduling offset may be used to account for the timing offset (e.g., represented by a parameter K_mac) between the uplink frame and the downlink frame at the network node or base station. FIG. 5 includes a base station 510 (e.g., a network node), a UE 520, downlink control information (DCI) 512 on a physical downlink control channel (PDCCH), uplink transmission 522 on a physical uplink shared channel (PUSCH), and satellite 530. As illustrated in FIG. 5, K_offset (also referred to as Koffset or $K_{offset}$) may help to ensure causality between DCI 512 on the PDCCH and uplink transmission 522 on the PUSCH. As indicated herein, K_offset may be a scheduling offset or a timing offset associated with a propagation delay between a base station (e.g., a network node or a base station of an NTN) and a UE. In some aspects, the scheduling offset may be not less than the round-trip time (RTT) between the UE and the base station minus the timing offset K_mac. In some instances, the PUSCH may be scheduled by the DCI (e.g., as the uplink transmission 522 is transmitted after the DCI 512).

As indicated in FIG. 5, causality may be violated if the time duration from the transmission of a scheduling to the expected receiving of the associated uplink transmission is less than the round-trip delay between the UE and the base station. In an NTN, the round-trip delay may be large compared to a terrestrial network. A duration of K_offset, Koffset, or $K_{offset}$ may be greater in length than a round trip delay (RTD) between the base station 510 (e.g., a network node or a gNB) of the NTN and the UE 520 via an NTN entity (e.g., satellite 530) in the NTN, where the RTD may be in slots. In some aspects, in the case of the presence of a time offset between the uplink frame and the downlink frame at the base station, a duration of K_offset, Koffset, or $K_{offset}$ may be greater in length than a round trip delay (RTD) between the base station 510 (e.g., a network node or a gNB) of the NTN and the UE 520 via an NTN entity (e.g., satellite 530) in the NTN minus the time offset, where the RTD may be in slots. Also, K2 may represent a duration between the DCI 512 and the uplink transmission 522 on the PUSCH in a terrestrial network. However, with a longer propagation delay (e.g., 100 ms) in an NTN, K_offset or $K_{offset}$ may be added as a scheduling offset or a timing offset, such that a duration between the transmission of the DCI 512 by the base station 510 and the reception of the associated uplink transmission 522 scheduled by the DCI 512 is equal to $K_{offset}$+K2. By using $K_{offset}$, the UE 520 may transmit, and the base station 510 may expect to receive, the uplink transmission 522 at an appropriate time. In some scenarios, such as regenerative satellite deployment, $K_{offset}$ may be used for communications between the UE 520 and the base station 510 carried by the satellite 530.

Figure 6:
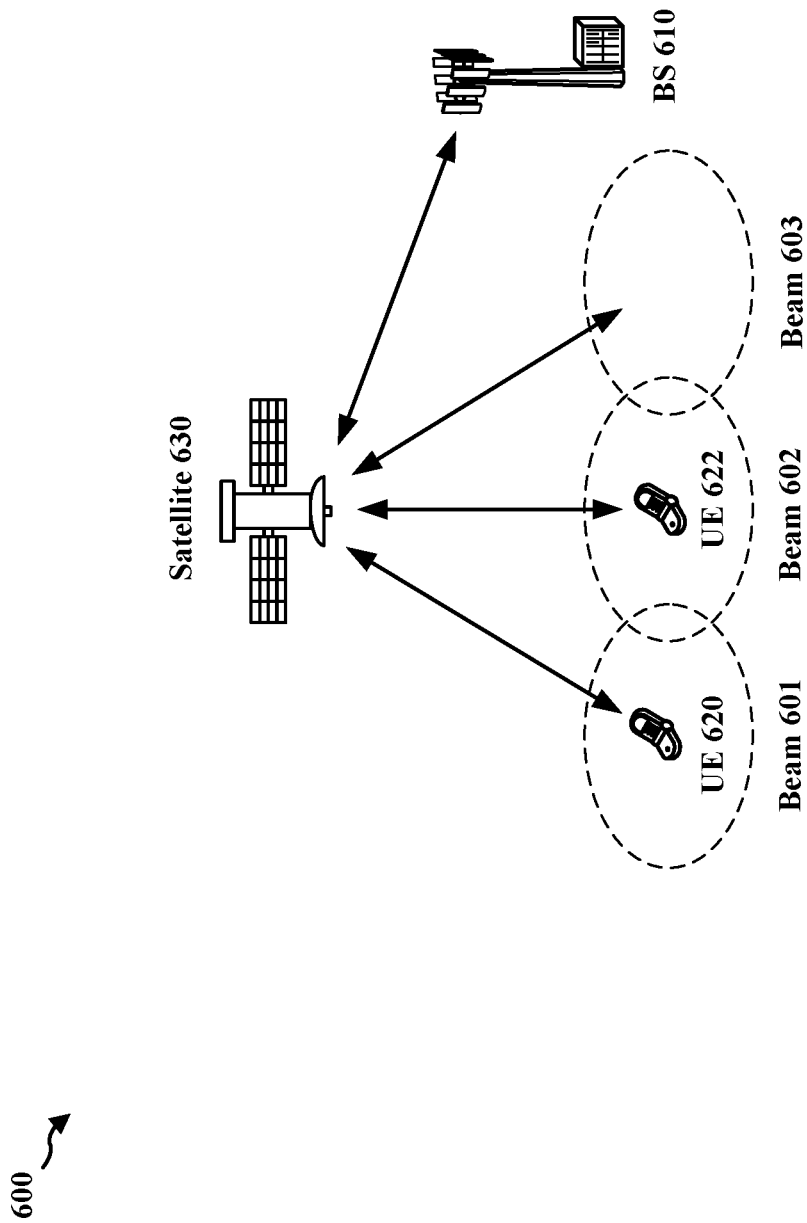
FIG. 6 is a diagram illustrating example timing offsets.

FIG. 6 is a diagram 600 illustrating an example of scheduling or timing offsets. FIG. 6 includes base station 610 (e.g., a network node or a gNB), UE 620, UE 622, and satellite 630. For instance, base station 610 may communicate with UE 620 and UE 622 via satellite 630. In some instances, UE 620 may perform a procedure for establishing a connection with the base station 610. The procedure may be referred to as an initial access procedure. UE 620 may use a cell-specific scheduling offset as a scheduling offset ($K_{offset}$) or a timing offset for the initial access procedure. Also, the cell-specific scheduling offset may be specific to a cell, as the UE 620 may receive the cell-specific scheduling offset in a system information block (SIB), e.g., a SIB type 1 (SIB1), that is broadcast within a cell.

After the initial access procedure, UE 620 may receive an indication of an updated scheduling offset to use as the scheduling offset $K_{offset}$ (i.e., an updated $K_{offset}$) or timing offset. In some instances, a value of the updated scheduling offset (updated $K_{offset}$) may be indicated in a medium access control (MAC) control element (MAC-CE) or a radio resource control (RRC) message. The updated scheduling offset (updated $K_{offset}$) may be considered an update over the cell-specific offset that the UE 620 originally used for the initial access procedure. Further, the updated scheduling offset may be non-cell-specific. That is, the updated offset may be UE-specific, beam-specific, or UE group-specific. Moreover, a duration of the updated scheduling offset may be shorter than a duration of the cell-specific scheduling offset. As such, the updated scheduling offset may reduce a delay between the DCI and the uplink transmission, which may improve throughput.

FIG. 6 also depicts that the satellite 630 may use multiple beam (e.g., beam 601, beam 602, and beam 603) to communicate with multiple UEs (e.g., UE 620 and UE 622). In some instances, if there are multiple beams, the cell-specific scheduling offset may be whichever $K_{offset}$ has a greater duration between the UEs, e.g., between UE 620 and UE 622. For certain UEs, the cell-specific scheduling offset may cause too much delay, and a UE may determine that a more customized $K_{offset}$ (e.g., a UE-specific offset or a beam-specific offset) is more suitable. Although a UE may receive an updated scheduling offset, the cell-specific scheduling offset may be a more appropriate $K_{offset}$. However, in some instances, the UE may not able to select between the cell-specific scheduling offset and the updated scheduling offset. As such, the throughput for the UEs, e.g., UE 620 and UE 622, may not be optimal.

In some aspects, it may be unclear as to which K_offset or $K_{offset}$ to use for certain types of uplink communication, e.g., a PDCCH ordered physical random access channel (PRACH). For instance, for a random access procedure initiated by a PDCCH order received in downlink, e.g., slot n, a UE may determine a next available PRACH occasion after an uplink slot, e.g., slot n+$K_{offset}$, in order to transmit an ordered PRACH. The UE's timing advance (TA) may be based on a TA applied by an NTN UE. For example, the UE's TA may be: $T_{TA}=(N_{TA}+N_{TA,UE-specific}+N_{TA,common}+N_{TA,offset})\times T_C$, where $N_{TA}=0$ is assumed for a PDCCH ordered PRACH. In some instances, it may be beneficial to determine which value of K_offset or $K_{offset}$ may be applied. Further, it may be beneficial to determine whether the n+$K_{offset}$ timing relationship is impacted by UE behavior within or outside of a certain duration associated with a validity duration or validity timer.

In some cases, a validity duration or validity timer may be associated with the validity of the uplink timing for uplink transmissions. In some cases, the base station may indicate to the UE whether the UE needs to abandon or proceed with a scheduled uplink transmission (e.g., a PDCCH ordered PRACH, a PUCCH, or a PUSCH) upon the expiration of the validity duration or validity timer. In some cases, a standards specification may specify whether the UE needs to abandon or proceed with a scheduled uplink transmission (e.g., a PDCCH ordered PRACH, a PUCCH, or a PUSCH) upon the expiration of the validity duration or validity timer. In some cases, the UE may decide on its own whether to abandon or proceed with a scheduled uplink transmission (e.g., a PDCCH ordered PRACH, a PUCCH, or a PUSCH) upon the expiration of the validity duration or validity timer.

In some instances, if a radio network temporary identifier (RNTI) in scheduling DCI is addressed to a specific UE, such as cell RNTI (C-RNTI), the UE may select a UE-specific K_offset updated after initial access for an uplink transmission. For example, the UE may select a UE-specific K_offset for an uplink (UL) transmission if the UE-specific K_offset is configured, otherwise the UE may select a beam-specific or UE-group-specific K_offset for an UL transmission. The UL transmission may be a PUSCH or a hybrid automatic repeat request (HARQ) acknowledgement (ACK)/negative ACK (NACK) in response to a PDSCH. In some aspects, in the case of a PDCCH order (i.e., sent in a DCI) that is addressed with C-RNTI, the UE may use the cell-specific K_offset, as the timing may be offset by a certain amount. This offset may be a reason for the network to initiate the PDCCH order. Additionally, a UE may select the type of K_offset based on an indication. For example, if DCI is used for scheduling, the indication may be transmitted in DCI that provides an uplink (UL) grant. Also, the indication may be transmitted in a MAC-CE or an RRC message preceding the DCI that provides the UL grant.

As indicated above, certain types of K_offset, e.g., a UE-specific K_offset or a cell-specific K_offset, may be utilized for certain uplink transmissions, e.g., a PDCCH ordered PRACH. Accordingly, it may be beneficial to determine how to apply a UE-specific K_offset or a cell-specific K_offset. For instance, it may be beneficial to determine how a UE handles a UE-specific K_offset if a cell-specific K_offset is selected. In some aspects, it may be beneficial for a UE to use a UE-specific K_offset which may be offset by a small amount, e.g., if this saves the base station power/complexity when detecting the PRACH. Further, it may be beneficial for DCI, an RRC message, or a MAC-CE to indicate which K_offset is to be used.

Aspects of the present disclosure may determine how to apply a K_offset, such as a UE-specific K_offset or a cell-specific K_offset. For instance, aspects of the present disclosure may determine how a UE handles a UE-specific K_offset if a cell-specific K_offset is selected. In some instances, aspects of the present disclosure may allow a UE to use a UE-specific K_offset which may be offset by a small amount, e.g., if this saves a base station power/complexity when detecting the PRACH. Additionally, aspects of the present disclosure may allow DCI, an RRC message, or a MAC-CE to indicate which K_offset is to be used. Aspects of the present disclosure may include a number of benefits or advantages, such as a more customizable K_offset (i.e., a UE-specific K_offset, a cell-specific K_offset, or a beam-specific K_offset). This customizable K_offset may result in a reduced PRACH latency and/or save on the complexity/power of detecting a PRACH at a base station.

Some aspects of the present disclosure may allow for a K_offset selection via a network configuration or a specification pre-configuration. More specifically, a K_offset may be selected for an uplink transmission (e.g., a PUSCH, a PUCCH, or a PDCCH ordered PRACH) via a network/base station configuration or indicated in a specification. For instance, a network/base station may configure (e.g., via RRC signaling or a MAC-CE), or the specification may indicate, which K_offset to use for an uplink transmission (e.g., a PUSCH, a PUCCH, or a PDCCH ordered PRACH). In some instances, aspects of the present disclosure may use a cell-specific K_offset, e.g., a cell-specific K_offset indicated in a system information block (SIB), and the network may configure (or the specification may specify) what to do with the UE-specific K_offset. For example, the K_offset may be updated after an initial access procedure, such that the K_offset may be UE-specific (i.e., a UE-specific K_offset) or beam-specific (i.e., a beam-specific K_offset), where the beam is a beam that serves the UE.

In some aspects, a UE-specific K_offset may become invalid after a specific time period once the indication is received from a network/base station, such as in the case of network configuration. Likewise, the UE-specific K_offset may become invalid after a specific time period once an uplink transmission (e.g., a PUSCH, PUCCH, or PRACH) is transmitted, such as in the case of a specification-indicated K_offset. Also, the UE-specific K_offset may be used after the uplink transmission (e.g., via a PUSCH, PUCCH, or PRACH) is transmitted. That is, the UE-specific K_offset may be selected, or the at least one K_offset may be adjusted/switched from the cell-specific K_offset to the UE-specific K_offset, after the uplink transmission is transmitted, which may result in different options, such as maintaining the current value of the K_offset (i.e., no change in value). Selecting the UE-specific K_offset after the uplink transmission may allow the K_offset to be updated with a correction value in a random access response (RAR) command following the uplink transmission, i.e., a "UE-specific K_offset new" value may be equal to a "UE-specific K_offset old" value plus a correction value (correction_value). Further, selecting the UE-specific K_offset, or adjusting/switching from the cell-specific K_offset to the UE-specific K_offset, after the uplink transmission may allow the K_offset to be updated with a fixed correction value (e.g., a value of 1 slot), where "UE-specific K_offset new"="UE-specific K_offset old"+correction_value.

Additionally, aspects of the present disclosure may use a UE-specific K_offset as the K_offset. In this instance, there may be no update to the UE-specific K_offset, such that the UE-specific K_offset maintains a current value of the UE-specific K_offset. Moreover, the UE-specific K_offset may include a fixed correction value (e.g., 1 slot), such that "UE-specific K_offset new"="UE-specific K_offset old"+correction_value.

Some aspects of the present disclosure may also allow for a K_offset selection via DCI, e.g., a DCI indication. For instance, the network/base station may dynamically indicate which K_offset to use for an uplink transmission (e.g., a PUSCH, PUCCH, or PDCCH ordered PRACH). In some instances, the indicator or indication of the K_offset may be in DCI or a PDCCH order. The K_offset indicator may also use one bit, where one value (e.g., '0') indicates a UE-specific K_offset and the other value (e.g., '1') indicates a cell-specific K_offset. If the indication specifies to use a cell-specific K_offset, the UE may further adjust the UE-specific K_offset according to a network configuration (e.g., via an RRC message or a MAC-CE) or as indicated in a specification.

In some aspects, a UE-specific K_offset may become invalid after a specific time period once the DCI is received or the uplink transmission (PUSCH, PUCCH, or PRACH) is transmitted. Additionally, the UE-specific K_offset may be used after the uplink transmission (e.g., via a PUSCH, PUCCH, or PRACH) is transmitted. Thus, the at least one K_offset may be selected as the UE-specific K_offset, or adjusted/switched from the cell-specific K_offset to the UE-specific K_offset, after the uplink transmission is transmitted, which may result in maintaining the current value of the K_offset (i.e., no change in value). Selecting the UE-specific K_offset after the uplink transmission may allow the K_offset to be updated with a correction value in a random access response (RAR) command following the uplink transmission, i.e., a "UE-specific K_offset new" value=a "UE-specific K_offset old" value+a correction value (correction_value). Also, selecting the UE-specific K_offset after the uplink transmission may allow the K_offset to be updated with a fixed correction value (e.g., a value of 1 slot), where "UE-specific K_offset new"="UE-specific K_offset old"+correction_value.

In some instances, if the indication specifies to use a cell-specific K_offset, the handling of the UE-specific K_offset may result in a number of different options. For instance, if the indication specifies to use a cell-specific K_offset, there may be no update on the UE-specific K_offset. Further, if the indication specifies to use a cell-specific K_offset, the K_offset may include a fixed correction value (e.g., a value of 1 slot), where "UE-specific K_offset new"="UE-specific K_offset old"+correction_value.

Figure 7:
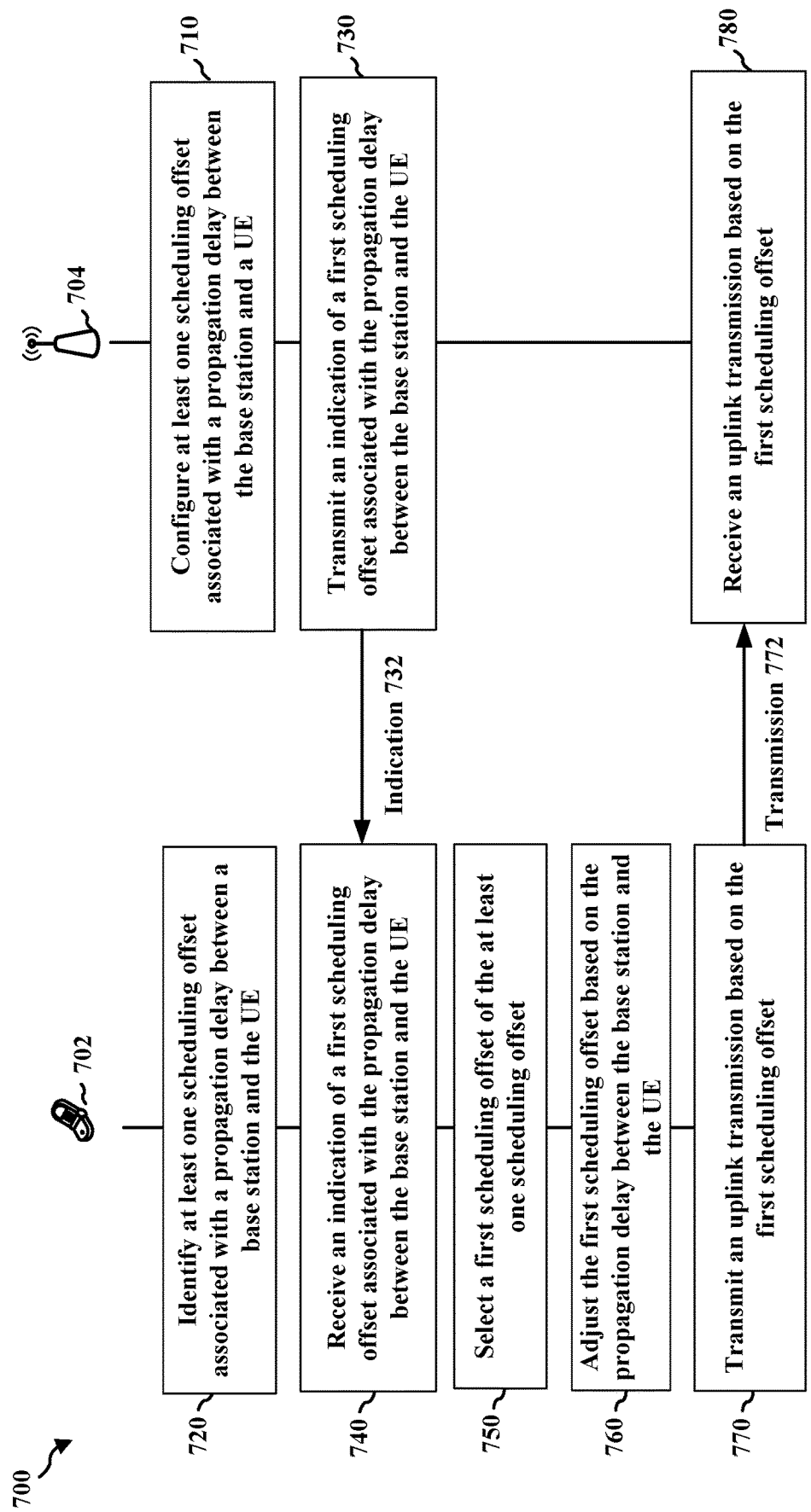
FIG. 7 is a diagram illustrating example communication between a UE and a base station.

FIG. 7 is a diagram 700 illustrating example communication between a UE 702 and a base station 704, e.g., a network node or a base station of an NTN.

At 710, base station 704 may configure at least one scheduling offset associated with a propagation delay between the base station and a UE (e.g., UE 702).

At 720, UE 702 may identify at least one scheduling offset associated with a propagation delay between a base station of a non-terrestrial network (NTN) (e.g., base station 704) and the UE. In some instances, the at least one scheduling offset may be preconfigured or pre-specified in a specification. In some aspects, the scheduling offset may be some value greater than a UE-gNB round trip time (RTT) minus a delay, i.e., a time offset of the uplink frame and downlink frame at the gNB (referred to as K_mac). Accordingly, the scheduling offset may be associated with at least a propagation delay, such that it may be associated with other types of delays or time values.

The at least one scheduling offset may be at least one K_offset including one or more of a cell-specific K_offset, a UE-specific K_offset, or a beam-specific K_offset, such that the first scheduling offset may be the cell-specific K_offset, the UE-specific K_offset, or the beam-specific K_offset. In some aspects, the first scheduling offset may be the cell-specific K_offset. The UE-specific K_offset may be invalid after a first time period once an indication of the at least one scheduling offset is received, or the UE-specific K_offset may be invalid after a second time period once the uplink transmission is transmitted. Also, the UE-specific K_offset may be selected as the first scheduling offset after the uplink transmission is transmitted. The UE-specific K_offset may maintain a current value of the UE-specific K_offset. The UE-specific K_offset may also include a correction value in a random access response (RAR) after the uplink transmission is transmitted. Further, the UE-specific K_offset may include a fixed correction value. In some instances, the first scheduling offset may be the UE-specific K_offset. The UE-specific K_offset may maintain a current value of the UE-specific K_offset. The UE-specific K_offset may also include a fixed correction value.

At 730, base station 704 may transmit, to the UE (e.g., UE 702), an indication of a first scheduling offset of the at least one scheduling offset associated with the propagation delay between the base station and the UE (e.g., indication 732).

At 740, UE 702 may receive, from the base station (e.g., base station 704), an indication of a first scheduling offset of the at least one scheduling offset associated with the propagation delay between the base station and the UE (e.g., indication 732), where the first scheduling offset is selected based on the indication. The indication may be received via a radio resource control (RRC) message or a medium access control (MAC) control element (MAC-CE). Also, the indication may be received via downlink control information (DCI). The indication of the at least one scheduling offset may be associated with one or more field bits.

At 750, UE 702 may select a first scheduling offset of the at least one scheduling offset associated with the propagation delay between the base station and the UE.

At 760, UE 702 may adjust the first scheduling offset based on the propagation delay between the base station and the UE.

At 770, UE 702 may transmit, to the base station, an uplink transmission based on the first scheduling offset (e.g., transmission 772), the uplink transmission being associated with a physical uplink shared channel (PUSCH), a physical uplink control channel (PUCCH), or a physical random access channel (PRACH). The uplink transmission may be associated with the PRACH, and the PRACH may be a physical downlink control channel (PDCCH) ordered PRACH. The propagation delay may be associated with the NTN, and the at least one scheduling offset may account for the propagation delay to ensure causality between downlink control information (DCI) on a physical downlink control channel (PDCCH) and the uplink transmission on the PUSCH, where the PUSCH may be scheduled by the DCI. In some aspects, the uplink transmission may be transmitted to an NTN entity (e.g., a satellite). The NTN entity may be either a base station (e.g., in the case of a regenerative satellite) or a relay (e.g., in the case of a bent-pipe satellite) which may forward the transmission without looking at the content. As such, in some instances, the first device that the transmission encounters may be another NTN entity.

At 780, base station 704 may receive, from the UE, an uplink transmission based on the first scheduling offset of the at least one scheduling offset (e.g., transmission 772), the uplink transmission being associated with a physical uplink shared channel (PUSCH), a physical uplink control channel (PUCCH), or a physical random access channel (PRACH).

Figure 8:
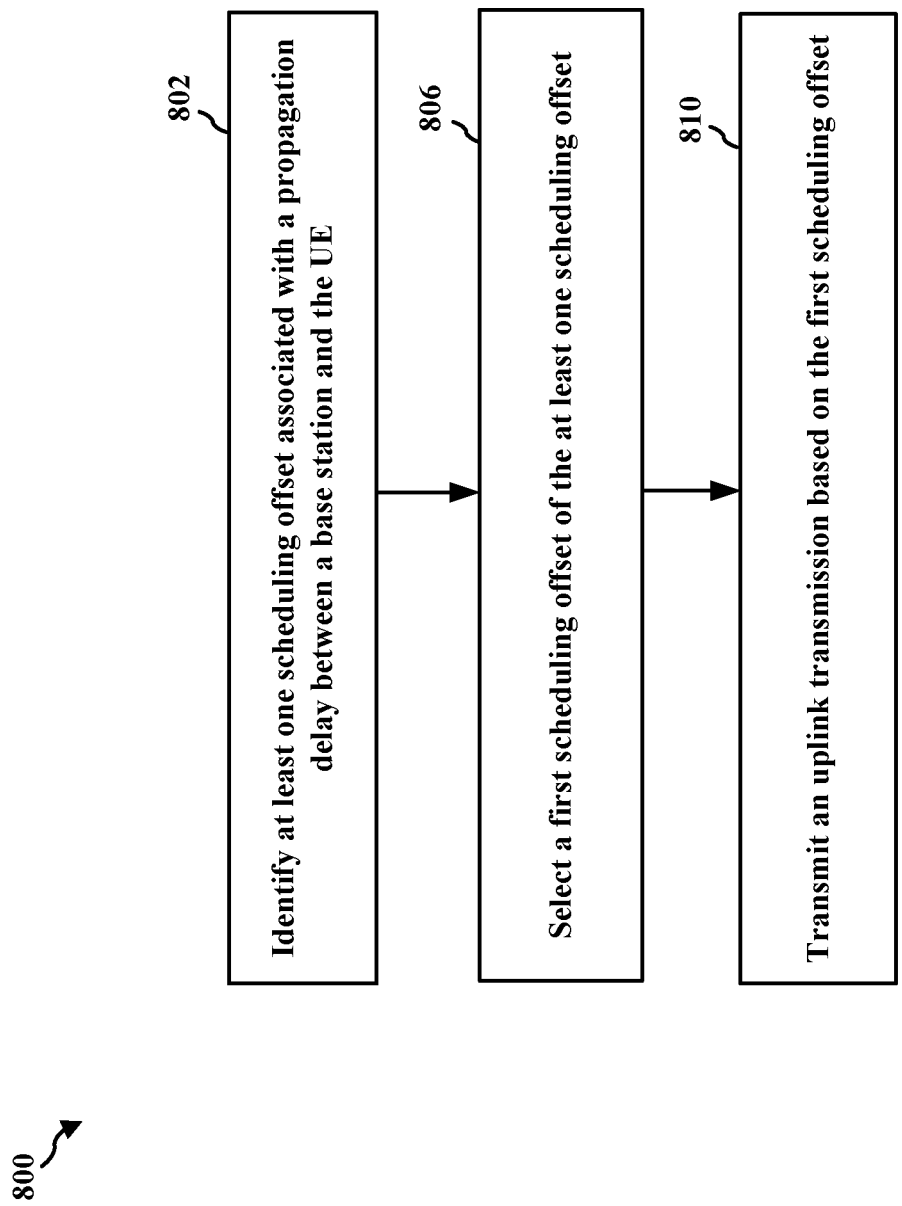
FIG. 8 is a flowchart of a method of wireless communication.

FIG. 8 is a flowchart 800 of a method of wireless communication. The method may be performed by a UE or a component of a UE (e.g., the UE 104, 350, 410, 460, 520, 620, 622, 702; the apparatus 1102). The methods described herein may provide a number of benefits, such as improving communication signaling, resource utilization, and/or power savings.

At 802, the UE may identify at least one scheduling offset associated with a propagation delay between a network node of a non-terrestrial network (NTN) and the UE, as described in connection with the examples in FIGS. 4-7. For example, UE 702 may identify at least one scheduling offset associated with a propagation delay between a network node of a non-terrestrial network (NTN) and the UE, as described in connection with 720 in FIG. 7. Further, 802 may be performed by determination component 1140 in FIG. 11. In some instances, the at least one scheduling offset may be preconfigured or pre-specified in a specification.

The at least one scheduling offset may be at least one K_offset including one or more of a cell-specific K_offset, a UE-specific K_offset, or a beam-specific K_offset, such that the first scheduling offset may be the cell-specific K_offset, the UE-specific K_offset, or the beam-specific K_offset. In some aspects, the first scheduling offset may be the cell-specific K_offset. The UE-specific K_offset may be invalid after a first time period once an indication of the at least one scheduling offset is received, or the UE-specific K_offset may be invalid after a second time period once the uplink transmission is transmitted. Also, the UE-specific K_offset may be selected as the first scheduling offset after the uplink transmission is transmitted. The UE-specific K_offset may maintain a current value of the UE-specific K_offset. The UE-specific K_offset may also include a correction value in a random access response (RAR) after the uplink transmission is transmitted. Further, the UE-specific K_offset may include a fixed correction value. In some instances, the first scheduling offset may be the UE-specific K_offset. The UE-specific K_offset may maintain a current value of the UE-specific K_offset. The UE-specific K_offset may also include a fixed correction value. In some aspects, the K_offset value may be signaled in system information and may be used for a PDCCH ordered PRACH timing relationship.

At 806, the UE may select a first scheduling offset of the at least one scheduling offset associated with the propagation delay between the network node and the UE, as described in connection with the examples in FIGS. 4-7. For example, UE 702 may select a first scheduling offset of the at least one scheduling offset associated with the propagation delay between the network node and the UE, as described in connection with 750 in FIG. 7. Further, 806 may be performed by determination component 1140 in FIG. 11.

At 810, the UE may transmit, to the network node, an uplink transmission based on the first scheduling offset, the uplink transmission being associated with a physical uplink shared channel (PUSCH), a physical uplink control channel (PUCCH), or a physical random access channel (PRACH), as described in connection with the examples in FIGS. 4-7. For example, UE 702 may transmit, to the network node, an uplink transmission based on the first scheduling offset, the uplink transmission being associated with a physical uplink shared channel (PUSCH), a physical uplink control channel (PUCCH), or a physical random access channel (PRACH), as described in connection with 770 in FIG. 7. Further, 810 may be performed by determination component 1140 in FIG. 11. The uplink transmission may be associated with the PRACH, and the PRACH may be a physical downlink control channel (PDCCH) ordered PRACH. The propagation delay may be associated with the NTN, and the at least one scheduling offset may account for the propagation delay to ensure causality between downlink control information (DCI) on a physical downlink control channel (PDCCH) and the uplink transmission on the PUSCH, where the PUSCH may be scheduled by the DCI.

Figure 9:
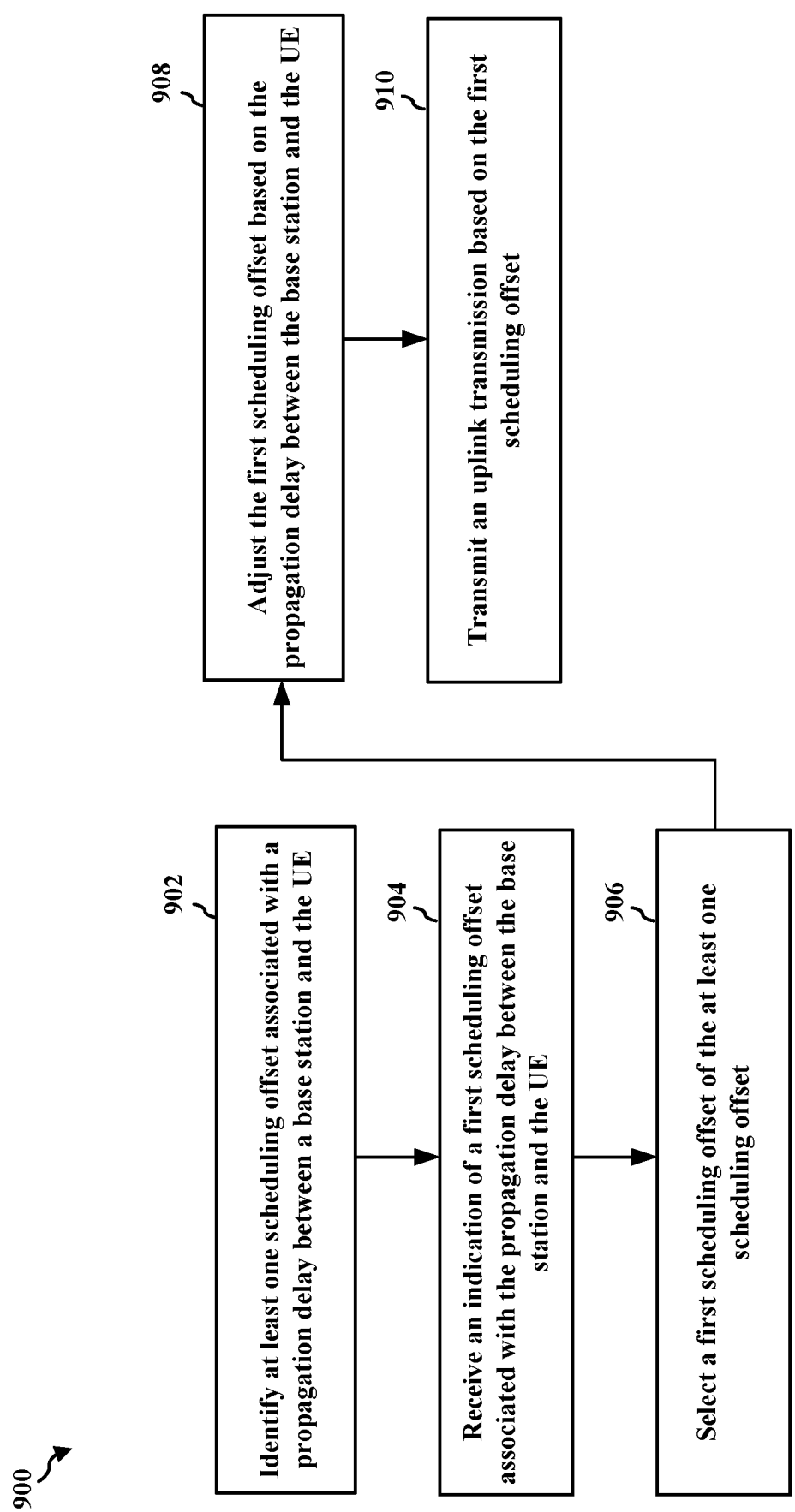
FIG. 9 is a flowchart of a method of wireless communication.

FIG. 9 is a flowchart 900 of a method of wireless communication. The method may be performed by a UE or a component of a UE (e.g., the UE 104, 350, 410, 460, 520, 620, 622, 702; the apparatus 1102). The methods described herein may provide a number of benefits, such as improving communication signaling, resource utilization, and/or power savings.

At 902, the UE may identify at least one scheduling offset associated with a propagation delay between a network node of a non-terrestrial network (NTN) and the UE, as described in connection with the examples in FIGS. 4-7. For example, UE 702 may identify at least one scheduling offset associated with a propagation delay between a network node of a non-terrestrial network (NTN) and the UE, as described in connection with 720 in FIG. 7. Further, 902 may be performed by determination component 1140 in FIG. 11. In some instances, the at least one scheduling offset may be preconfigured or pre-specified in a specification.

At 904, the UE may receive, from the network node, an indication of a first scheduling offset of the at least one scheduling offset associated with the propagation delay between the network node and the UE, where the first scheduling offset is selected based on the indication, as described in connection with the examples in FIGS. 4-7. For example, UE 702 may receive, from the network node, an indication of the at least one scheduling offset associated with the propagation delay between the network node and the UE, as described in connection with 740 in FIG. 7. Further, 904 may be performed by determination component 1140 in FIG. 11. The indication may be received via a radio resource control (RRC) message or a medium access control (MAC) control element (MAC-CE). Also, the indication may be received via downlink control information (DCI). The indication of the at least one scheduling offset may be associated with one or more field bits.

At 906, the UE may select a first scheduling offset of the at least one scheduling offset associated with the propagation delay between the network node and the UE, as described in connection with the examples in FIGS. 4-7. For example, UE 702 may select a first scheduling offset of the at least one scheduling offset associated with the propagation delay between the network node and the UE, as described in connection with 750 in FIG. 7. Further, 906 may be performed by determination component 1140 in FIG. 11.

The at least one scheduling offset may be at least one K_offset including one or more of a cell-specific K_offset, a UE-specific K_offset, or a beam-specific K_offset, such that the first scheduling offset may be the cell-specific K_offset, the UE-specific K_offset, or the beam-specific K_offset. In some aspects, the first scheduling offset may be the cell-specific K_offset. The UE-specific K_offset may be invalid after a first time period once an indication of the at least one scheduling offset is received, or the UE-specific K_offset may be invalid after a second time period once the uplink transmission is transmitted. Also, the UE-specific K_offset may be selected as the first scheduling offset after the uplink transmission is transmitted. The UE-specific K_offset may maintain a current value of the UE-specific K_offset. The UE-specific K_offset may also include a correction value in a random access response (RAR) after the uplink transmission is transmitted. Further, the UE-specific K_offset may include a fixed correction value. In some instances, the first scheduling offset may be the UE-specific K_offset. The UE-specific K_offset may maintain a current value of the UE-specific K_offset. The UE-specific K_offset may also include a fixed correction value.

At 908, the UE may adjust the first scheduling offset based on the propagation delay between the network node and the UE, as described in connection with the examples in FIGS. 4-7. For example, UE 702 may adjust the first scheduling offset based on the propagation delay between the network node and the UE, as described in connection with 760 in FIG. 7. Further, 908 may be performed by determination component 1140 in FIG. 11.

At 910, the UE may transmit, to the network node, an uplink transmission based on the first scheduling offset, the uplink transmission being associated with a physical uplink shared channel (PUSCH), a physical uplink control channel (PUCCH), or a physical random access channel (PRACH), as described in connection with the examples in FIGS. 4-7. For example, UE 702 may transmit, to the network node, an uplink transmission based on the first scheduling offset, the uplink transmission being associated with a physical uplink shared channel (PUSCH), a physical uplink control channel (PUCCH), or a physical random access channel (PRACH), as described in connection with 770 in FIG. 7. Further, 910 may be performed by determination component 1140 in FIG. 11. The uplink transmission may be associated with the PRACH, and the PRACH may be a physical downlink control channel (PDCCH) ordered PRACH. The propagation delay may be associated with the NTN, and the at least one scheduling offset may account for the propagation delay to ensure causality between downlink control information (DCI) on a physical downlink control channel (PDCCH) and the uplink transmission on the PUSCH, where the PUSCH may be scheduled by the DCI.

Figure 10:
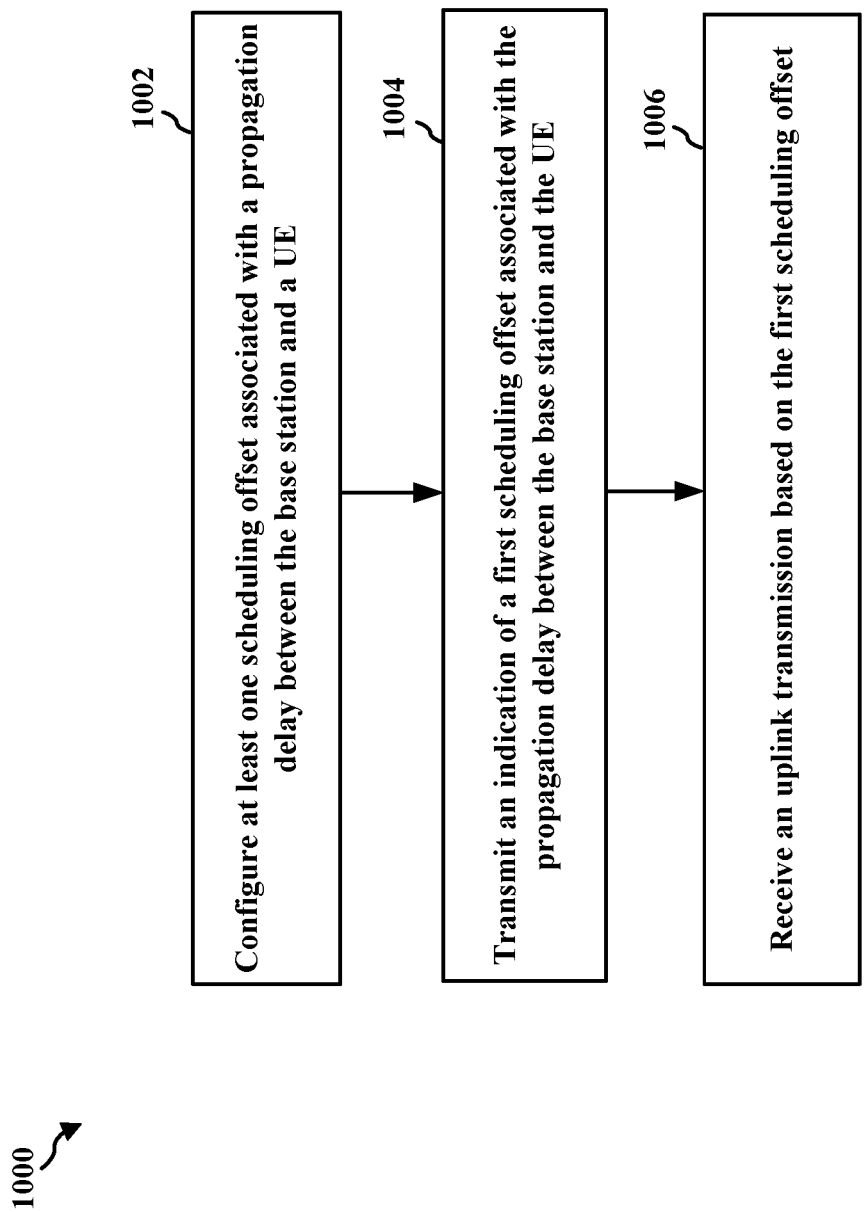
FIG. 10 is a flowchart of a method of wireless communication.

FIG. 10 is a flowchart 1000 of a method of wireless communication. The method may be performed by a network node or a base station, e.g., a base station of an NTN, or a component of a network node or a base station (e.g., the base station 102, 180, 310, 490, 510, 610, 704; the apparatus 1202). The methods described herein may provide a number of benefits, such as improving communication signaling, resource utilization, and/or power savings.

At 1002, the network node may configure at least one scheduling offset associated with a propagation delay between the network node and a UE, as described in connection with the examples in FIGS. 4-7. For example, base station 704 may configure at least one scheduling offset associated with a propagation delay between the network node and a UE, as described in connection with 710 in FIG. 7. Further, 1002 may be performed by determination component 1240 in FIG. 12. In some instances, the at least one scheduling offset may be preconfigured in a specification or pre-specified in a specification.

At 1004, the network node may transmit, to the UE, an indication of a first scheduling offset of the at least one scheduling offset associated with the propagation delay between the network node and the UE, as described in connection with the examples in FIGS. 4-7. For example, base station 704 may transmit, to the UE, an indication of the at least one scheduling offset associated with the propagation delay between the network node and the UE, as described in connection with 730 in FIG. 7. Further, 1004 may be performed by determination component 1240 in FIG. 12. The indication may be transmitted via a radio resource control (RRC) message or a medium access control (MAC) control element (MAC-CE). Also, the indication may be transmitted via downlink control information (DCI). The indication of the at least one scheduling offset may be associated with one or more field bits.

At 1006, the network node may receive, from the UE, an uplink transmission based on the first scheduling offset of the at least one scheduling offset, the uplink transmission being associated with a physical uplink shared channel (PUSCH), a physical uplink control channel (PUCCH), or a physical random access channel (PRACH), as described in connection with the examples in FIGS. 4-7. For example, base station 704 may receive, from the UE, an uplink transmission based on a first scheduling offset of the at least one scheduling offset, the uplink transmission being associated with a physical uplink shared channel (PUSCH), a physical uplink control channel (PUCCH), or a physical random access channel (PRACH), as described in connection with 780 in FIG. 7. Further, 1006 may be performed by determination component 1240 in FIG. 12. The uplink transmission may be associated with the PRACH, and the PRACH may be a physical downlink control channel (PDCCH) ordered PRACH. The propagation delay may be associated with the NTN, and the at least one scheduling offset may account for the propagation delay to ensure causality between downlink control information (DCI) on a physical downlink control channel (PDCCH) and the uplink transmission on the PUSCH, where the PUSCH may be scheduled by the DCI.

The at least one scheduling offset may be at least one K_offset including one or more of a cell-specific K_offset, a UE-specific K_offset, or a beam-specific K_offset, such that the first scheduling offset may be the cell-specific K_offset, the UE-specific K_offset, or the beam-specific K_offset. In some aspects, the first scheduling offset may be the cell-specific K_offset. The UE-specific K_offset may be invalid after a first time period once the indication of the at least one scheduling offset is transmitted, or the UE-specific K_offset may be invalid after a second time period once the uplink transmission is received. Also, the UE-specific K_offset may correspond to the first scheduling offset based on the uplink transmission. The UE-specific K_offset may maintain a current value of the UE-specific K_offset. The UE-specific K_offset may also include a correction value in a random access response (RAR) after the uplink transmission is received. Further, the UE-specific K_offset may include a fixed correction value. In some instances, the first scheduling offset may be the UE-specific K_offset. The UE-specific K_offset may maintain a current value of the UE-specific K_offset. The UE-specific K_offset may also include a fixed correction value.

Figure 11:
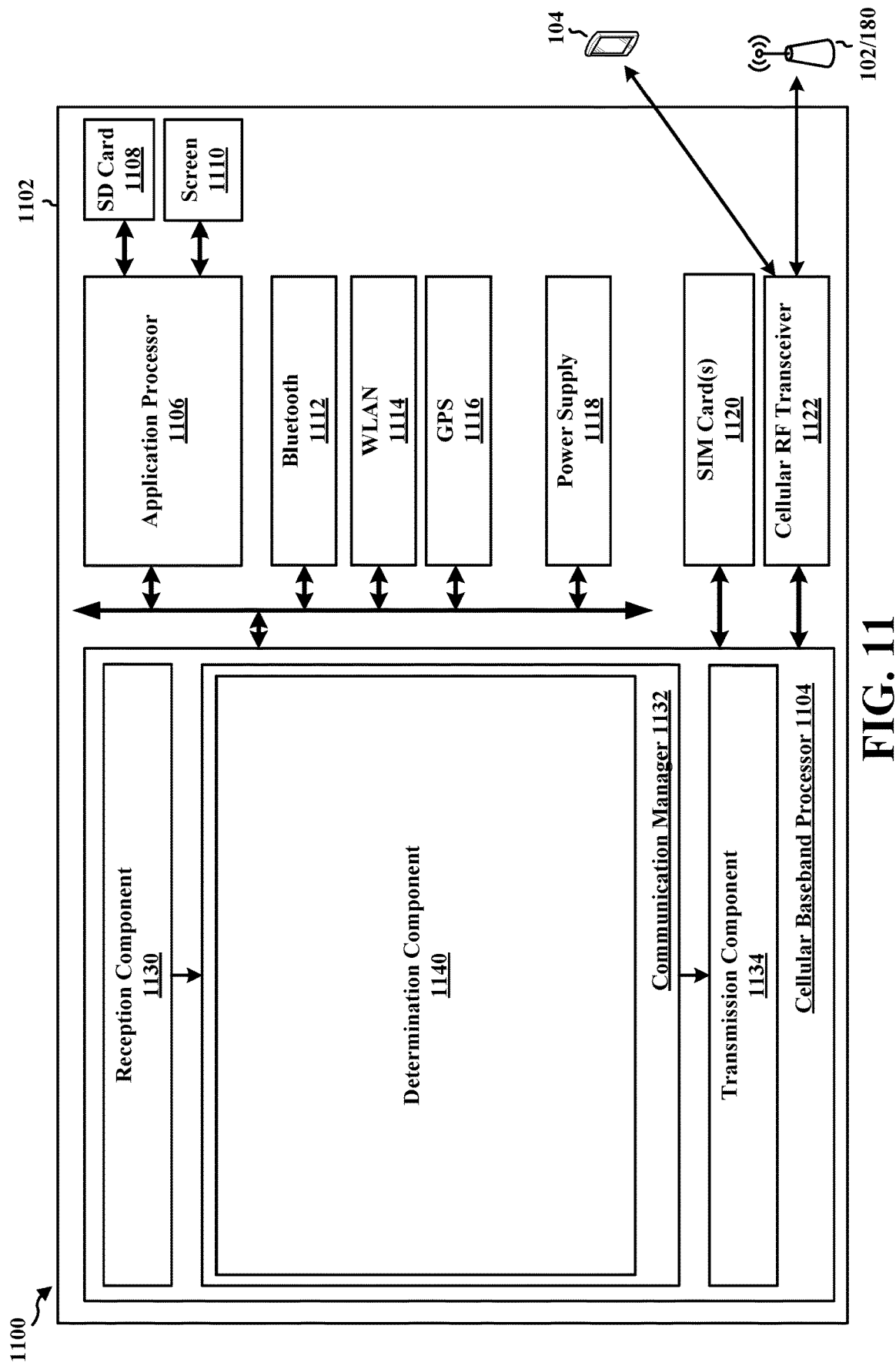
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a determination component 1140 that is configured to identify at least one scheduling offset associated with a propagation delay between a network node of a non-terrestrial network (NTN) and the UE, e.g., as described in connection with step 902 above. Determination component 1140 may also be configured to receive, from the network node, an indication of a first scheduling offset of the at least one scheduling offset associated with the propagation delay between the network node and the UE, where the first scheduling offset is selected based on the indication, e.g., as described in connection with step 904 above. Determination component 1140 may also be configured to select a first scheduling offset of the at least one scheduling offset associated with the propagation delay between the network node and the UE, e.g., as described in connection with step 906 above. Determination component 1140 may also be configured to adjust the first scheduling offset based on the propagation delay between the network node and the UE, e.g., as described in connection with step 908 above. Determination component 1140 may also be configured to transmit, to the network node, an uplink transmission based on the first scheduling offset, the uplink transmission being associated with a physical uplink shared channel (PUSCH), a physical uplink control channel (PUCCH), or a physical random access channel (PRACH), e.g., as described in connection with step 910 above.

The apparatus may include additional components that perform each of the blocks of the algorithm in the flowcharts of FIGS. 7-9. As such, each block in the flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for identifying at least one scheduling offset associated with a propagation delay between a network node of a non-terrestrial network (NTN) and the UE; means for receiving, from the network node, an indication of a first scheduling offset of the at least one scheduling offset associated with the propagation delay between the network node and the UE, where the first scheduling offset is selected based on the indication; means for selecting a first scheduling offset of the at least one scheduling offset associated with the propagation delay between the network node and the UE; means for adjusting the first scheduling offset based on the propagation delay between the network node and the UE; and means for transmitting, to the network node, an uplink transmission based on the first scheduling offset, the uplink transmission being associated with a physical uplink shared channel (PUSCH), a physical uplink control channel (PUCCH), or a physical random access channel (PRACH). The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
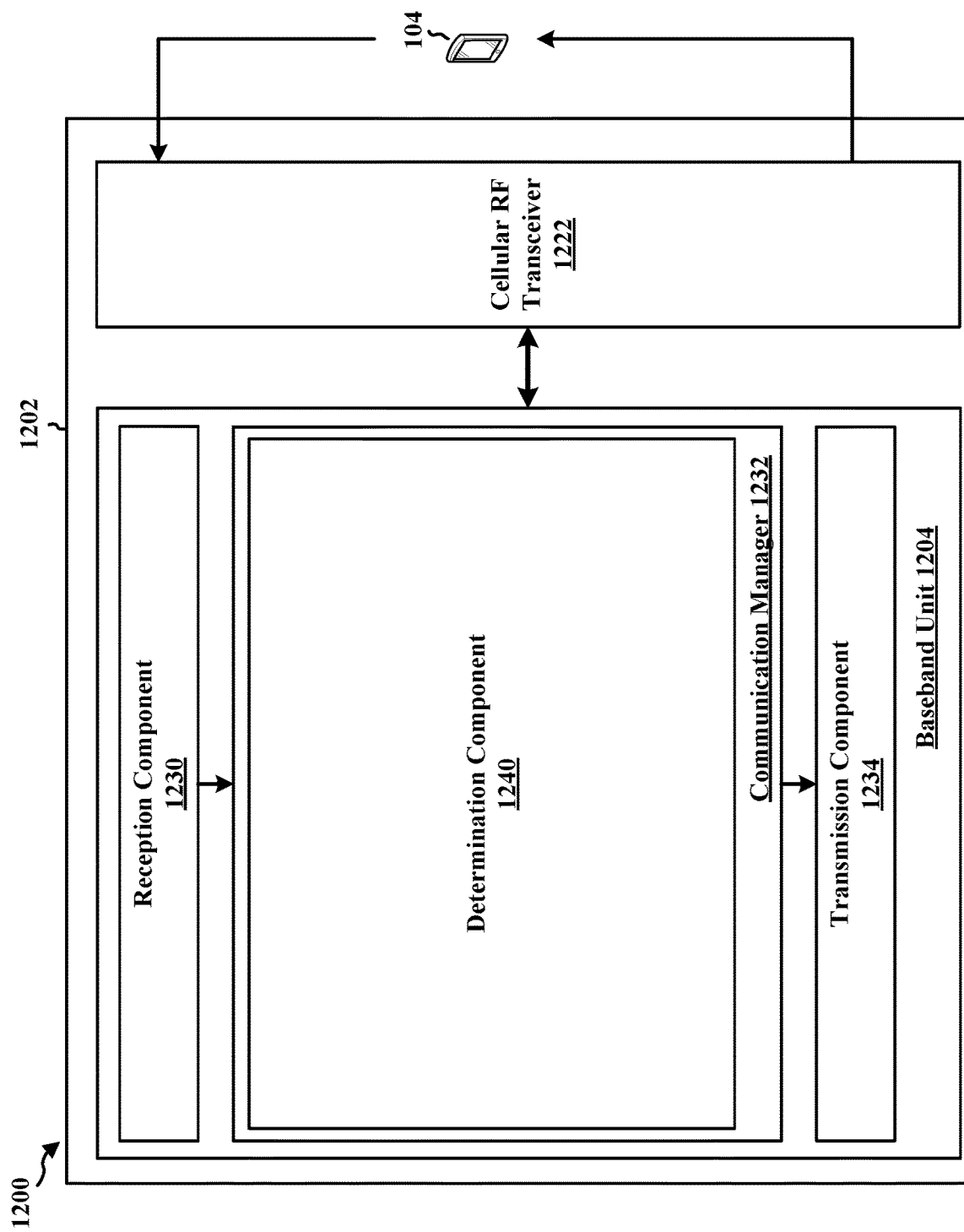
FIG. 12 is a diagram illustrating an example of a hardware implementation for an example apparatus.

FIG. 12 is a diagram 1200 illustrating an example of a hardware implementation for an apparatus 1202. The apparatus 1202 may be a network node or a base station (e.g., a base station of an NTN), a component of a network node or a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a determination component 1240 that is configured to configure at least one scheduling offset associated with a propagation delay between the network node and a user equipment (UE), e.g., as described in connection with step 1002 above. Determination component 1240 may also be configured to transmit, to the UE, an indication of a first scheduling offset of the at least one scheduling offset associated with the propagation delay between the network node and the UE, e.g., as described in connection with step 1004 above. Determination component 1240 may also be configured to receive, from the UE, an uplink transmission based on the first scheduling offset of the at least one scheduling offset, the uplink transmission being associated with a physical uplink shared channel (PUSCH), a physical uplink control channel (PUCCH), or a physical random access channel (PRACH), e.g., as described in connection with step 1006 above.

The apparatus may include additional components that perform each of the blocks of the algorithm in the flowcharts of FIGS. 7 and 10. As such, each block in the flowcharts of FIGS. 7 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for configuring at least one scheduling offset associated with a propagation delay between the network node and a user equipment (UE); means for transmitting, to the UE, an indication of a first scheduling offset of the at least one scheduling offset associated with the propagation delay between the network node and the UE; and means for receiving, from the UE, an uplink transmission based on the first scheduling offset of the at least one scheduling offset, the uplink transmission being associated with a physical uplink shared channel (PUSCH), a physical uplink control channel (PUCCH), or a physical random access channel (PRACH). The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: identify at least one scheduling offset associated with a propagation delay between a network node of a non-terrestrial network (NTN) and the UE; select a first scheduling offset of the at least one scheduling offset associated with the propagation delay between the network node and the UE; and transmit, to the network node, an uplink transmission based on the first scheduling offset, the uplink transmission being associated with a physical uplink shared channel (PUSCH), a physical uplink control channel (PUCCH), or a physical random access channel (PRACH).

Aspect 2 is the apparatus of aspect 1, where the uplink transmission is associated with the PRACH, and the PRACH is a physical downlink control channel (PDCCH) ordered PRACH.

Aspect 3 is the apparatus of any of aspects 1 and 2, where the at least one processor is further configured to: receive, from the network node, an indication of a first scheduling offset of the at least one scheduling offset associated with the propagation delay between the network node and the UE, where the first scheduling offset is selected based on the indication.

Aspect 4 is the apparatus of any of aspects 1 to 3, where the indication is received via a radio resource control (RRC) message or a medium access control (MAC) control element (MAC-CE).

Aspect 5 is the apparatus of any of aspects 1 to 4, where the indication is received via downlink control information (DCI).

Aspect 6 is the apparatus of any of aspects 1 to 5, where the at least one scheduling offset is at least one K_offset including one or more of a cell-specific K_offset, a UE-specific K_offset, or a beam-specific K_offset, such that the first scheduling offset is the cell-specific K_offset, the UE-specific K_offset, or the beam-specific K_offset.

Aspect 7 is the apparatus of any of aspects 1 to 6, where the first scheduling offset is the cell-specific K_offset.

Aspect 8 is the apparatus of any of aspects 1 to 7, where the UE-specific K_offset is invalid after a first time period once an indication of the at least one scheduling offset is received, or the UE-specific K_offset is invalid after a second time period once the uplink transmission is transmitted.

Aspect 9 is the apparatus of any of aspects 1 to 8, where the UE-specific K_offset is selected as the first scheduling offset after the uplink transmission is transmitted.

Aspect 10 is the apparatus of any of aspects 1 to 9, where the UE-specific K_offset maintains a current value of the UE-specific K_offset.

Aspect 11 is the apparatus of any of aspects 1 to 10, where the UE-specific K_offset includes a correction value in a random access response (RAR) after the uplink transmission is transmitted.

Aspect 12 is the apparatus of any of aspects 1 to 11, where the UE-specific K_offset includes a fixed correction value.

Aspect 13 is the apparatus of any of aspects 1 to 12, where the first scheduling offset is the UE-specific K_offset.

Aspect 14 is the apparatus of any of aspects 1 to 13, where the UE-specific K_offset maintains a current value of the UE-specific K_offset.

Aspect 15 is the apparatus of any of aspects 1 to 14, where the UE-specific K_offset includes a fixed correction value.

Aspect 16 is the apparatus of any of aspects 1 to 15, where the propagation delay is associated with the NTN, and the at least one scheduling offset accounts for the propagation delay to ensure causality between downlink control information (DCI) on a physical downlink control channel (PDCCH) and the uplink transmission on the PUSCH, the PUSCH being scheduled by the DCI.

Aspect 17 is the apparatus of any of aspects 1 to 16, where an indication of the at least one scheduling offset is associated with one or more field bits.

Aspect 18 is the apparatus of any of aspects 1 to 17, where the at least one scheduling offset is preconfigured or pre-specified in a specification.

Aspect 19 is the apparatus of any of aspects 1 to 18, where the at least one processor is further configured to: adjust the first scheduling offset based on the propagation delay between the network node and the UE.

Aspect 20 is the apparatus of any of aspects 1 to 19, further including a transceiver or an antenna coupled to the at least one processor.

Aspect 21 is a method of wireless communication for implementing any of aspects 1 to 20.

Aspect 22 is an apparatus for wireless communication including means for implementing any of aspects 1 to 20.

Aspect 23 is a non-transitory computer-readable medium storing computer executable code, where the code when executed by a processor causes the processor to implement any of aspects 1 to 20.

Aspect 24 is an apparatus for wireless communication at a network node or a base station, e.g., a network node or a base station of an NTN, including at least one processor coupled to a memory and configured to: configure at least one scheduling offset associated with a propagation delay between the network node and a user equipment (UE); transmit, to the UE, an indication of a first scheduling offset of the at least one scheduling offset associated with the propagation delay between the network node and the UE; and receive, from the UE, an uplink transmission based on the first scheduling offset of the at least one scheduling offset, the uplink transmission being associated with a physical uplink shared channel (PUSCH), a physical uplink control channel (PUCCH), or a physical random access channel (PRACH).

Aspect 25 is the apparatus of aspect 24, where the uplink transmission is associated with the PRACH, and the PRACH is a physical downlink control channel (PDCCH) ordered PRACH.

Aspect 26 is the apparatus of any of aspects 24 and 25, where the indication is transmitted via a radio resource control (RRC) message or a medium access control (MAC) control element (MAC-CE).

Aspect 27 is the apparatus of any of aspects 24 to 26, where the indication is transmitted via downlink control information (DCI).

Aspect 28 is the apparatus of any of aspects 24 to 27, where the at least one scheduling offset is at least one K_offset including one or more of a cell-specific K_offset, a UE-specific K_offset, or a beam-specific K_offset, such that the first scheduling offset is the cell-specific K_offset, the UE-specific K_offset, or the beam-specific K_offset.

Aspect 29 is the apparatus of any of aspects 24 to 28, where the first scheduling offset is the cell-specific K_offset.

Aspect 30 is the apparatus of any of aspects 24 to 29, where the UE-specific K_offset is invalid after a first time period once the indication is transmitted, or the UE-specific K_offset is invalid after a second time period once the uplink transmission is received.

Aspect 31 is the apparatus of any of aspects 24 to 30, where the UE-specific K_offset corresponds to the first scheduling offset based on the uplink transmission.

Aspect 32 is the apparatus of any of aspects 24 to 31, where the UE-specific K_offset maintains a current value of the UE-specific K_offset.

Aspect 33 is the apparatus of any of aspects 24 to 32, where the UE-specific K_offset includes a correction value in a random access response (RAR) after the uplink transmission is received.

Aspect 34 is the apparatus of any of aspects 24 to 33, where the UE-specific K_offset includes a fixed correction value.

Aspect 35 is the apparatus of any of aspects 24 to 34, where the first scheduling offset is the UE-specific K_offset.

Aspect 36 is the apparatus of any of aspects 24 to 35, where the UE-specific K_offset maintains a current value of the UE-specific K_offset.

Aspect 37 is the apparatus of any of aspects 24 to 36, where the UE-specific K_offset includes a fixed correction value.

Aspect 38 is the apparatus of any of aspects 24 to 37, where the propagation delay is associated with the NTN, and the at least one scheduling offset accounts for the propagation delay to ensure causality between downlink control information (DCI) on a physical downlink control channel (PDCCH) and the uplink transmission on the PUSCH, the PUSCH being scheduled by the DCI.

Aspect 39 is the apparatus of any of aspects 24 to 38, where the indication of the at least one scheduling offset is associated with one or more field bits.

Aspect 40 is the apparatus of any of aspects 24 to 39, where the at least one scheduling offset is preconfigured or pre-specified in a specification.

Aspect 41 is the apparatus of any of aspects 24 to 40, further including a transceiver or an antenna coupled to the at least one processor.

Aspect 42 is a method of wireless communication for implementing any of aspects 24 to 41.

Aspect 43 is an apparatus for wireless communication including means for implementing any of aspects 24 to 41.

Aspect 44 is a non-transitory computer-readable medium storing computer executable code, where the code when executed by a processor causes the processor to implement any of aspects 24 to 41.

What is claimed is:

1. An apparatus for wireless communication at a user equipment (UE), comprising:
    memory; and
    at least one processor coupled to the memory and configured to:
        identify at least one scheduling offset associated with a propagation delay between a network node of a non-terrestrial network (NTN) and the UE, wherein the at least one scheduling offset is at least one K_offset including one or more of a cell-specific K_offset, a UE-specific K_offset, or a beam-specific K_offset;
        select a first scheduling offset of the at least one scheduling offset associated with the propagation delay between the network node and the UE, wherein the first scheduling offset is the cell-specific K_offset; and
        transmit, to the network node, an uplink transmission based on the first scheduling offset, the uplink transmission being associated with a physical uplink shared channel (PUSCH), a physical uplink control channel (PUCCH), or a physical random access channel (PRACH), wherein the UE-specific K_offset is selected as the first scheduling offset after the uplink transmission is transmitted.

2. The apparatus of claim 1, wherein the uplink transmission is associated with the PRACH, and the PRACH is a physical downlink control channel (PDCCH) ordered PRACH.

3. The apparatus of claim 1, wherein the at least one processor is further configured to:
    receive, from the network node, an indication of the first scheduling offset of the at least one scheduling offset associated with the propagation delay between the network node and the UE, wherein the first scheduling offset is selected based on the indication.

4. The apparatus of claim 3, wherein the indication is received via downlink control information (DCI), a radio resource control (RRC) message, or a medium access control (MAC) control element (MAC-CE).

5. The apparatus of claim 1, wherein the UE-specific K_offset is invalid after a first time period once an indication of the at least one scheduling offset is received, or the UE-specific K_offset is invalid after a second time period once the uplink transmission is transmitted.

6. The apparatus of claim 1, wherein the UE-specific K_offset maintains a current value of the UE-specific K_offset.

7. The apparatus of claim 1, wherein the UE-specific K_offset includes a correction value in a random access response (RAR) after the uplink transmission is transmitted.

8. The apparatus of claim 1, wherein the UE-specific K_offset includes a fixed correction value.

9. The apparatus of claim 1, wherein the propagation delay is associated with the NTN, and the at least one scheduling offset accounts for the propagation delay to ensure causality between downlink control information (DCI) on a physical downlink control channel (PDCCH) and the uplink transmission on the PUSCH, the PUSCH being scheduled by the DCI.

10. The apparatus of claim 1, wherein an indication of the at least one scheduling offset is associated with one or more field bits, and wherein the at least one scheduling offset is preconfigured or pre-specified in a specification.

11. The apparatus of claim 1, further including a transceiver or an antenna coupled to the at least one processor, wherein the at least one processor is further configured to:
adjust the first scheduling offset based on the propagation delay between the network node and the UE.

12. A method of wireless communication at a user equipment (UE), comprising:
identifying at least one scheduling offset associated with a propagation delay between a network node of a non-terrestrial network (NTN) and the UE, wherein the at least one scheduling offset is at least one K_offset including one or more of a cell-specific K_offset, a UE-specific K_offset, or a beam-specific K_offset;
selecting a first scheduling offset of the at least one scheduling offset associated with the propagation delay between the network node and the UE, wherein the first scheduling offset is the cell-specific K_offset; and
transmitting, to the network node, an uplink transmission based on the first scheduling offset, the uplink transmission being associated with a physical uplink shared channel (PUSCH), a physical uplink control channel (PUCCH), or a physical random access channel (PRACH, wherein the UE-specific K_offset is selected as the first scheduling offset after the uplink transmission is transmitted.

13. The method of claim 12, wherein the uplink transmission is associated with the PRACH, and the PRACH is a physical downlink control channel (PDCCH) ordered PRACH.

14. The method of claim 12, further comprising:
receiving, from the network node, an indication of the first scheduling offset of the at least one scheduling offset associated with the propagation delay between the network node and the UE, wherein the first scheduling offset is selected based on the indication.

15. The method of claim 14, wherein the indication is received via downlink control information (DCI), a radio resource control (RRC) message, or a medium access control (MAC) control element (MAC-CE).

16. The method of claim 12, wherein the UE-specific K_offset is invalid after a first time period once an indication of the at least one scheduling offset is received, or the UE-specific K_offset is invalid after a second time period once the uplink transmission is transmitted.

17. The method of claim 12, wherein the UE-specific K_offset maintains a current value of the UE-specific K_offset.

18. The method of claim 12, wherein the UE-specific K_offset includes a correction value in a random access response (RAR) after the uplink transmission is transmitted.

19. The method of claim 12, wherein the UE-specific K_offset includes a fixed correction value.

20. The method of claim 12, wherein the propagation delay is associated with the NTN, and the at least one scheduling offset accounts for the propagation delay to ensure causality between downlink control information (DCI) on a physical downlink control channel (PDCCH) and the uplink transmission on the PUSCH, the PUSCH being scheduled by the DCI.

21. The method of claim 12, wherein an indication of the at least one scheduling offset is associated with one or more field bits, and wherein the at least one scheduling offset is preconfigured or pre-specified in a specification.

22. The method of claim 12, further comprising:
adjusting the first scheduling offset based on the propagation delay between the network node and the UE.

* * * * *